Dec. 25, 1923.
P. W. BIDWELL
1,478,846
CLOTH PILING MACHINE
Filed Sept. 26, 1922   2 Sheets-Sheet 1
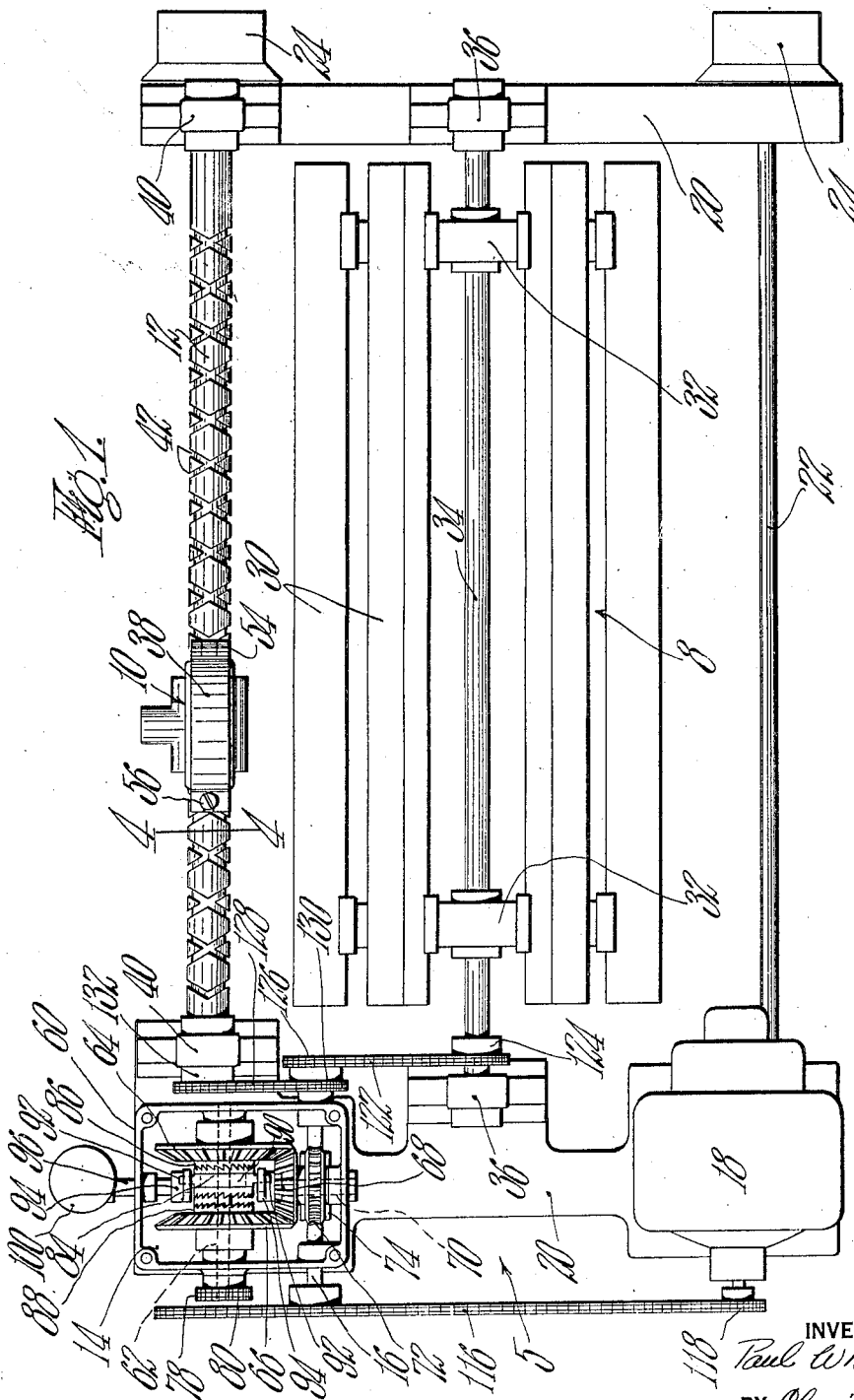
INVENTOR
Paul W Bidwell
BY Chapin & Neal
ATTORNEYS Dec. 25, 1923.
P. W. BIDWELL
CLOTH PILING MACHINE
Filed Sept. 26, 1922 2 Sheets-Sheet 2
1,478,846
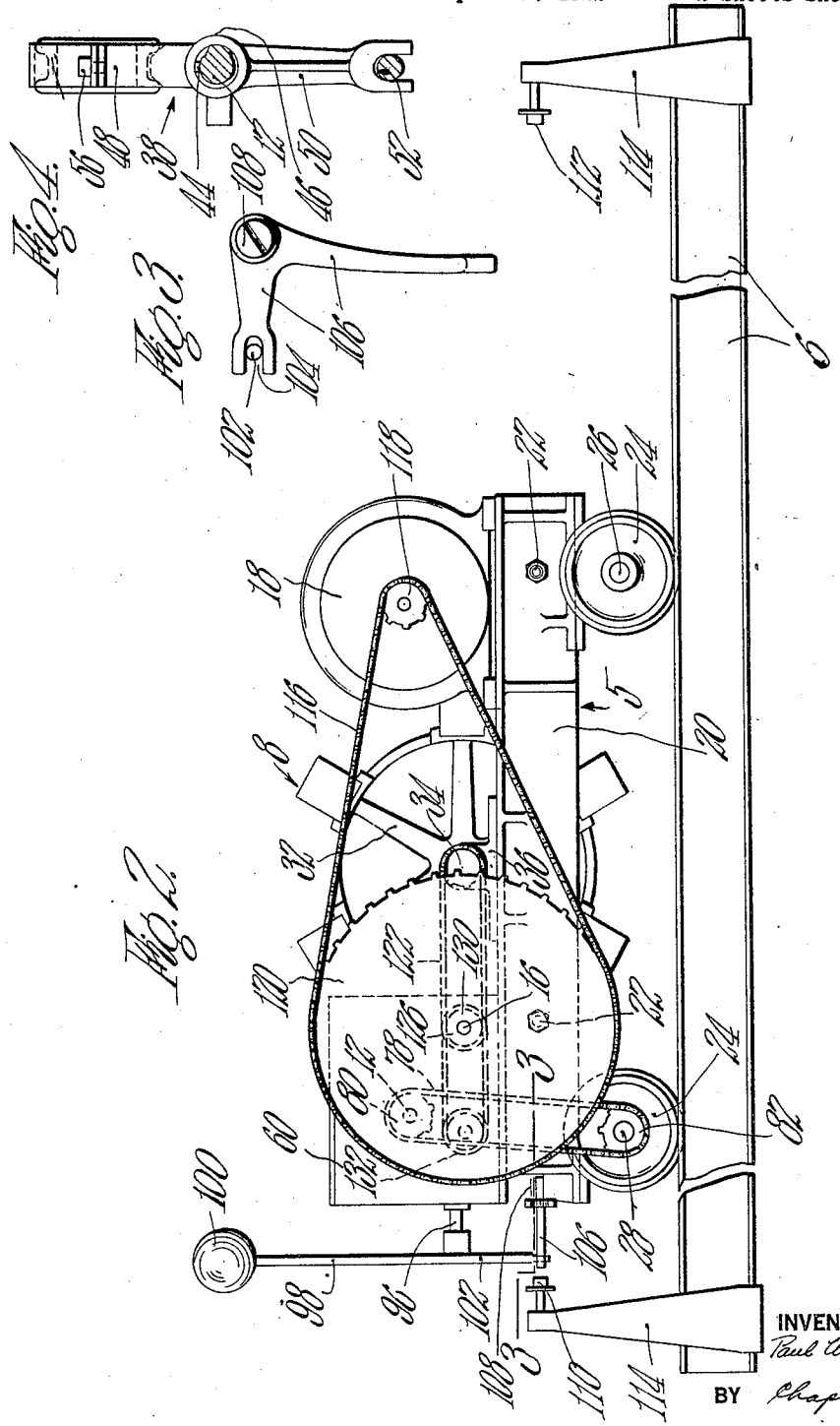
INVENTOR
Paul W. Bidwell
BY Chapin & Neal
ATTORNEYS Patented Dec. 25, 1923.

1,478,846

UNITED STATES PATENT OFFICE.

PAUL WINSHIP BIDWELL, OF EASTHAMPTON, MASSACHUSETTS, ASSIGNOR TO B. F. PERKINS & SON, INC., OF HOLYOKE, MASSACHUSETTS, A CORPORATION OF MASSACHUSETTS.

CLOTH-PILING MACHINE.

Application filed September 26, 1922. Serial No. 590,725.

*To all whom it may concern:*

Be it known that I, PAUL WINSHIP BIDWELL, citizen of the United States, residing at Easthampton, in the county of Hampshire and State of Massachusetts, have invented new and useful Improvements in Cloth-Piling Machines, of which the following is a specification.

The present invention relates to cloth piling machines and has for its object to improve and simplify the construction of machines of this character.

To this end the invention consists in the features of construction and in the combinations and arrangements of parts hereinafter described and claimed, the advantages of which will be obvious to those skilled in the art.

The invention will be explained with reference to the accompanying drawings, illustrating the preferred embodiment thereof, in which:—

Fig. 1 is a top plan view of the machine, the reversible carriage driving mechanism being disclosed by the removal of the cover plate from the housing within which said mechanism is mounted;

Fig. 2 is a side elevational view of the machine;

Fig. 3 is a detail view partially in section on the line 3—3 of Fig. 2; and

Fig. 4 is a sectional detail view taken along the line 4—4 of Fig. 1.

Referring to the drawings, the general construction of the present machine will first be briefly described as follows: The operating parts of the machine are mounted upon a wheeled carriage 5 which is movable upon a pair of parallel tracks 6, the latter extending along the sides of a tank or vat (not shown) in which the cloth, or other material operated upon, is to be piled. A rotatable cloth-feeding drum 8 is journaled in the carriage 5, the axis of the drum extending at right angles to the direction of carriage travel. A piling eye 10 is arranged to be reciprocated in parallelism with the rotational axis of the drum by means of a right and left hand screw shaft 12 which extends transversely across the carriage and is suitably journaled therein. The carriage 5 is adapted to be moved along the tracks 6 by means of reversible driving mechanism indicated by the general reference numeral 14, said mechanism operating to advance the carriage slowly in one direction for a predetermined distance and then to reverse the direction of travel of the carriage and move it a like distance in the opposite direction. A main driving shaft 16 is journaled on the carriage 4 and a motor 18 is supported by the carriage and supplies the power for driving said shaft. The driving shaft 16 is connected to rotate the drum 8, and the screw shaft 12, and to operate the reversible driving mechanism 14, said driven parts being actuated simultaneously and continuously during the operation of the machine.

The machine, thus briefly described, operates upon cloth or like material supplied thereto in rope form, to lay the cloth rope in loops or folds extending transversely across a tank or vat, the loops being laid progressively beside one another to form a layer or course reaching from one end of the tank to the other. The machine then operates to lay, in the reverse direction, a second layer or course upon the first, the second layer being also composed of transverse loops arranged in the same manner as in the first course. A third course is then laid upon the second course and so on, until the courses or layers ultimately form a pile of cloth rope which fills the tank to the desired elevation and in which the cloth is uniformly piled throughout its entire mass.

Although it is preferred to lay the loops or folds transversely of the tank, as above described, it is to be understood that the invention is not restricted to means for laying the loops in this manner inasmuch as the machine may be adapted, by suitable adjustments of its parts and minor changes of construction, to lay the loops longitudinally of the tank. Accordingly the terms "transverse," "longitudinal" and the like, hereinafter appearing in the specification and claims are to be interpreted as terms of description and not of limitation.

Proceeding now to a more detailed description of the machine, the tracks 6 may consist of I-beams, as shown, and they may be supported in any suitable manner adjacent the top of the tank and parallel to the side walls thereof. The tracks 6 may be made of sufficient length to extend alongside of a row of tanks and after a sufficient quantity of cloth has been laid in one tank the carriage 5 may be moved manually or otherwise along the tracks 6 to enable the machine to perform its cloth laying operation above another tank of the row above referred to. If desired, the machine may be rendered readily adaptable for use in connection with a second or third row of tanks arranged beside the first mentioned row by arranging a second pair of tracks transversely beneath the tracks 6 and providing the latter tracks with wheels adapted to roll over the transverse tracks so that the cloth piling machine may be shifted bodily in the direction of the piling eye travel for the purpose of locating it over a selected tank in any of the several rows.

The carriage 5 comprises a rectangular frame having opposite side members 20 and suitable transverse connecting bars 22. A flanged wheel 24 is provided adjacent each of the four corners of the carriage. The pair of wheels 24 which are located at the right end of the carriage, as viewed in Fig. 2, are secured to opposite ends of an axle 26 while the other two wheels are secured to an axle 28, the axles 26 and 28 being arranged to turn in suitable journal boxes supported by the side members 20 of the carriage. The cloth feeding drum 8 is of well known construction, consisting of a series of wooden slats or bars 30 which extend lengthwise of the drum, the opposite ends thereof being secured in spaced-apart relation upon the peripheries of two or more wheel-like supports 32. The supports 32 are rigidly secured in spaced apart relation upon a shaft 34 which is arranged parallel to the wheel axles 26 and 28 and which is journaled in bearings 36 secured to the upper faces of the side members of the carriage.

The piling eye 10 may be of any suitable construction and is mounted in a carrier 38 (Figs. 1 and 4) which rides upon and is supported and guided by the screw shaft 12. The screw shaft 12 is journaled in bearings 40 on the side members of the carriage 5 and is provided with double or right and left hand threads 42 which extend substantially throughout the length of the shaft and merge with one another adjacent each end of the shaft so as to provide a single endless channel for the reception of a suitable pawl or follower on the carrier 38. The pawl or follower just referred to is indicated conventionally at 44 and is of such a character that it will follow the path defined by the endless screw thread as the shaft 12 is rotated, reversing the direction of movement of the piling eye as the same approaches each end of the shaft, this being an expedient heretofore employed in cloth piling machines for obtaining timed reciprocation of the piling eye. As shown, the piling eye carrier 38 is preferably constructed as best shown in Fig. 4, having a sleeve portion 46 for receiving the screw-shaft 12, a standard 48 for supporting the piling eye, and a depending arm 50 which is forked at its lower extremity to straddle the wheel axle 28. The forked arm 50 slides freely upon the axle 28, as the piling eye carrier reciprocates, and said arm and axle coact to maintain the standard 48 in upright position. The standard 48 may be split, as shown, in the horizontal axial plane of the piling eye to facilitate the insertion and removal of the eye. The split portions of the standard 46 may be hinged together at one side of the piling eye, as shown at 54, and detachably secured in assembled relation by means of a screw 56 at the opposite side of the eye. In order to avoid the use of such a long screw shaft as would be required to effect an unusually long traverse of the piling eye it may be found desirable to employ two piling eyes, one of which will have a field of reciprocation transversely of the tank at one side of the longitudinal center line thereof, while the other piling eye reciprocates transversely of the tank at the other side of said center line. In such an event the right and left hand screw threads will extend throughout only approximately one half the length of the screw shaft and will be connected directly to actuate only one of the piling eye carriers, while the other piling eye carrier will be mounted to slide upon a smooth unthreaded portion of the shaft and connected by suitable linkage with the other piling eye carrier so as to reciprocate simultaneously therewith. Such an expedient will effect a considerable economy in the manufacture of the machine inasmuch as it will reduce by one half the length of the threaded portion of the screw shaft.

The reversible driving mechanism 14 which moves the carriage 5 is confined within a rectangular housing 60 supported by the carriage. The driving mechanism 14 comprises a horizontal shaft 62 which is journaled in the side walls of the housing 60 and which is adapted to be clutched to one or the other of two bevel gears 64 and 66. The gears 64 and 66 are arranged with their toothed faces opposed and they are loosely mounted on the shaft 62 and are continuously driven in opposite directions by means of a bevel pinion 68 which is interposed between them. The driving pinion 68 is adapted to turn on a stud 70 projecting inwardly from one end wall of the housing 60 and is driven through worm gearing comprising a worm wheel 72 that is compounded with the pinion 68 and a worm 74 that is fixed on the driving shaft 16. The driven shaft 62 projects through one of the side walls of the housing 60 and is connected at its projecting end with the axle 28 by means of a sprocket chain 78, said chain passing over a sprocket wheel 80 that is secured to the outwardly projecting end of said shaft and over a sprocket wheel 82 that is secured upon the axle 28. The axle 28 is driven through one of the bevel gears 64 or 66 to cause the carriage 5 to move in one direction along the tracks 6 until it has reached one end of the tank or vat in which the cloth is being laid and then the operative bevel gear is unclutched from the shaft 62 and the other of said bevel gears is clutched to said shaft to drive the axle 28 in the opposite direction and thus to reverse the direction of movement of the carriage 5. To this end a clutch is provided comprising a double acting driven clutch member or sleeve 84 on the shaft 62 and two driving clutch members 86 and 88 which are formed on the opposed faces of the gears 64 and 66, respectively. The driven clutch member or sleeve 88 is splined to the shaft 62 so as to rotate therewith while being free to slide longitudinally thereon. The opposite end faces of said clutch sleeve are provided with clutch teeth adapted to cooperatively engage corresponding clutch teeth on the adjacent faces of the respective driving clutch members 64 and 66.

To enable the driven clutch sleeve 84 to be held in engagement with one or the other of the two driving clutch members 86 and 88, and to be shifted when the carriage 5 reaches the limit of its movement in either direction, the following provision is made. A suitable split band 90 is fitted loosely within an annular groove in the clutch sleeve 84, said band having two pins 92 projecting horizontally therefrom at diametrically opposite points. These pins 92 are received in the slotted upper ends of two arms 94 which are rigidly secured upon a rock shaft 96 that extends beneath the shaft 62 and at right angles thereto, the rock shaft being journaled in the end walls of the housing 60. One end of the rockshaft 96 extends outside of the housing 60 and has rigidly secured thereto an arm 98 carrying at its upper end a weight 100. The rockshaft 96 is located midway between the driving clutch members 86 and 88 and the arm 98 is so disposed angularly with respect to said rockshaft 96 that when the clutch sleeve 84 is cooperatively engaged with the driving clutch member 86 the weight 100 will be positioned at the same side of the rockshaft as said clutch member 86 and thus will serve to hold the clutch sleeve 84 in engagement therewith. When the clutch sleeve 84 is shifted into engagement with the driving clutch member 88, the weight 100 will be moved across the center of the rockshaft and will serve to maintain the engagement of the sleeve 84 with said clutch member 88.

To effect the shifting of the driven clutch member, the arm 98 is extended downwardly below the rock shaft 96 as shown at 102. The lower end of the extension 102 is received in a slot 104 that is formed in the short arm of a bell crank lever 106. The lever 106 is fulcrumed at 108 upon the carriage 5 and its longer arm extends into position for engagement with two abutments 110 and 112 which are supported by standards 114 rising from opposite ends of one of the tracks 6. With this construction it will be seen that as the carriage 5 approaches the limit of its movement toward the left (in Fig. 2) the long arm of the bell crank lever 106 will engage the abutment 110. The continued movement of the carriage after such engagement is sufficient to swing the extension 102 of the arm 98 and thereby to rock the shaft 96 to shift the driven clutch member 84 out of engagement with the driving clutch member 86 and into engagement with the driving clutch member 88. The direction of rotation of the shaft 62 and the axle 28 will then be reversed and consequently the carriage 5 will move in the opposite direction, i. e., towards the right in Fig. 2. As the carriage approaches the limit of its movement toward the right, the long arm of the bell crank lever 106 will engage the abutment 112 and as the carriage continues to move a slight distance relatively to said abutment, the lever 106 is swung so that the shaft 96 is rocked to shift the driven clutch member 84 out of engagement with the driving clutch member 88 and into engagement with the driving clutch member 86, whereupon the direction of movement of the carriage 5 is again reversed. If desired, the abutments 110 and 112 may be made to yield somewhat when engaged by the lever 106 so as to cushion the shock resulting from such engagement.

The shaft 16 is driven from the motor 18 by means of a sprocket chain 116 which passes over a driving sprocket wheel 118 on the armature shaft of the motor and over a driven sprocket wheel 120 that is fixed upon the shaft 16. The cloth feeding drum 8 is driven from the shaft 16 by means of a sprocket chain 122 passing over a sprocket wheel 124 on the drum shaft 34 and over a sprocket wheel 126 that is secured to the shaft 16. Concurrently with the rotation of the drum 8, the screw shaft 12 is driven from the shaft 16 through a chain 128 that runs over a sprocket wheel 130 on the shaft 16 and over a sprocket wheel 132 on the screw shaft. The rotation of the screw shaft reciprocates the piling eye 10 as hereintofore described. While the drum 8 is rotating and the piling eye 10 is reciprocating, the carriage 5 is being slowly moved on the tracks 6, first in one direction and then in the other, by means of the reversible driving mechanism 14 and this mechanism is, in turn, driven from the shaft 16 through the worm gearing 72, 74 already described.

It will be apparent from an inspection of the drawings that the ratio of gearing is such as to insure that the piling eye will move back and forth transversely of the tank several times for each movement of the carriage in one direction longitudinally of the tank. From the foregoing description it will be understood that as the carriage 5 approaches either end of the tank the reversible driving mechanism 14 will operate to reverse the direction of travel of the carriage. As a result, therefore of the combination of back and forth transverse movements of the piling eye and the simultaneous movement of the carriage 5 in one direction lengthwise of the tank, a series of transverse stretches of cloth rope are progressively laid in side-by-side relation from one end of the tank to the other, e. g., from left to right, thus making up one layer or course of transverse stretches of cloth rope. After each layer or course has been laid, the direction of movement of the carriage 5 is reversed so that a series of succeeding stretches of cloth is progressively laid from right to left upon the first course. The superimposing of the courses or layers of cloth in the tank continues until the pile of cloth therein has reached the desired height for the performance of the dyeing, bleaching or other treatment to which the cloth is to be subjected.

Obviously, if it is desired to lay the folds or loops of cloth longitudinally of the tank or vat, this may be accomplished, whenever the available space in the mill or factory permits, by setting up the machine relatively to the tank so that the piling-eye-carriage 20 will reciprocate in the direction of the length of the tank instead of transversely with respect thereto, and by making the necessary adjustments to properly regulate the length of the traversing movements in each direction, of said carriage as well as the total distance traveled by the carriage 12 before its direction of movement is reversed.

While it is preferred to employ the specific construction and arrangement of parts herein shown and described, it will be understood that such construction and arragement is not essential except in so far as specified in the claims and may be changed or modified without departing from the spirit of the invention.

Having thus described the invention, what I claim as new is:

1. In a cloth piling machine, a rotatable cloth feeding drum, a piling eye movable longitudinally of said drum, means for supporting and guiding the piling eye, a carriage on which said drum and piling eye are mounted, a driving shaft, means driven from said shaft for reciprocating the piling eye on said supporting and guiding means and for moving the carriage alternately in opposite directions at right angles to the path of the piling eye, and separate driving connections between said shaft and said drum for rotating the drum.

2. In a cloth piling machine, a rotatable cloth feeding drum, a reciprocable piling eye for guiding the cloth as it is fed by the drum, a carriage on which the drum and piling eye are mounted, a driven shaft on said carriage, driving means directly connecting the said drum and driven shaft, separate driving means connecting the said shaft and piling eye and separate additional means driven from the said shaft for moving said carriage.

3. In a cloth piling machine, a pair of tracks, a wheeled carriage on said tracks, a rotatable cloth feeding drum and a reciprocable piling eye both mounted on said carriage, a main driving shaft and a driven shaft both journaled in said carriage, means driven from said driving shaft for actuating the drum, additional means driven from the driving shaft for actuating the piling eye, a driven clutch member slidable on said driven shaft, driving clutch members loosely mounted on said driven shaft on opposite sides of the driven clutch member, driving connections between said driving shaft and said driving clutch members for driving the latter in opposite directions, driving connections between said driven shaft and one of the wheels of the carriage, and means controlled by the position of the carriage for sliding said driven clutch member to disengage it from one of said driving clutch members and to engage it with the other driving clutch member.

4. In a cloth piling machine, a pair of tracks, a wheeled carriage on said tracks, a rotatable cloth feeding drum and a reciprocable piling eye both mounted on said carriage, a main driving shaft and a driven shaft both journaled in said carriage, separate means driven from said driving shaft for actuating the drum and the piling eye, reversible driving mechanism driven from said driving shaft for rotating said driven shaft in opposite directions, driving connections between said driven shaft and one of the wheels of said carriage, means including an oscillatory member mounted on said carriage for reversing said driving mechanism, and abutments located in the path of said oscillatory member and at opposite sides thereof, said member being adapted to alternately engage said abutments as the carriage approaches the limit of its movement in one direction or the other and to be actuated by continued movement of the carriage after such engagement to reverse said driving mechanism.

5. In a cloth piling machine, a wheeled carriage, a wheel axle journaled in said carriage, a pair of tracks for the carriage wheels, a cloth feeding drum and a rotatable right and left hand screw shaft on the carriage, said shaft being located above and parallel to said axle, a piling eye, a piling eye carrier on said screw shaft adapted to be reciprocated thereby, a forked arm depending from said carrier and straddling said axle for guiding said carrier, and means for rotating the drum and the screw shaft and for driving one of the carriage wheels to move the carriage upon said tracks.

6. In a cloth piling machine, a pair of tracks, a carriage movable on said tracks, a rotatable drum and a reciprocable piling eye both mounted on said carriage, a driving and a driven shaft both journaled in said carriage, reversible driving mechanism driven from said driving shaft for rotating said driven shaft in opposite directions, separate connections between the driving shaft and drum and between the driving shaft and piling eye whereby they are actuated independently, driving connections between said driven shaft and one wheel of said carriage for moving the carriage along the said tracks.

In testimony whereof I have affixed my signature.

PAUL WINSHIP BIDWELL.